United States Patent
Gibson

(10) Patent No.: US 9,067,830 B2
(45) Date of Patent: Jun. 30, 2015

(54) HYDRAULIC LIME COMPOSITION

(75) Inventor: Robin Gibson, Cotherstone (GB)

(73) Assignee: LIMECO LIMITED, Kendal, Cumbria (GB)

(*) Notice: Subject to any disclaimer, the term of this patent is extended or adjusted under 35 U.S.C. 154(b) by 243 days.

(21) Appl. No.: 13/577,950

(22) PCT Filed: Feb. 10, 2011

(86) PCT No.: PCT/GB2011/050242
§ 371 (c)(1),
(2), (4) Date: Aug. 9, 2012

(87) PCT Pub. No.: WO2011/098814
PCT Pub. Date: Aug. 18, 2011

(65) Prior Publication Data
US 2012/0304895 A1    Dec. 6, 2012

(30) Foreign Application Priority Data
Feb. 10, 2010 (GB) .................................. 1002223.4

(51) Int. Cl.
| | | |
|---|---|---|
| *C04B 2/02* | (2006.01) | |
| *C04B 2/04* | (2006.01) | |
| *C04B 28/18* | (2006.01) | |
| *C04B 28/12* | (2006.01) | |
| *C04B 111/00* | (2006.01) | |
| *C04B 111/10* | (2006.01) | |

(52) U.S. Cl.
CPC ................. *C04B 28/18* (2013.01); *C04B 28/12* (2013.01); *C04B 2111/00517* (2013.01); *C04B 2111/10* (2013.01); *C04B 2111/1018* (2013.01)

(58) Field of Classification Search
CPC .................................... C04B 2/02; C04B 2/04
USPC .................................. 106/796, 792, 705, 737
See application file for complete search history.

(56) References Cited

U.S. PATENT DOCUMENTS

2009/0277357 A1    11/2009    Parker et al.

FOREIGN PATENT DOCUMENTS

| JP | H04349162 A | 12/1992 |
|---|---|---|
| JP | H07196355 A | 8/1995 |
| JP | 2001072458 A | 3/2001 |
| JP | 2006104018 A | 4/2006 |
| JP | 2006104039 A | 4/2006 |
| WO | 96/20901 A1 | 7/1996 |

OTHER PUBLICATIONS

DE 2801687 A (Jul. 19, 1979) Abstract only.*
International Search Report and Written Opinion under date of mailing of May 6, 2011 in connection with PCT/GB2011/050242.
Imerys: Building and Construction: "Data Sheet: Metastar", Technical Information [Online], Apr. 2009; XP002632879.
P.J.P. Gleize, A. Muller, H.R. Roman: "Microstructural investigation of a silica fume-cement-lime mortar", Cement and Concrete Composites, vol. 25, 2003, pp. 171-175; XP0026328880.
Kasai, et al., New Mixing Material for Cement/Concrete, First Edition, Gijutsu Shoin, 2007, pp. 70-73.
Kitayama, et al., Removal of Impurities in Meerschaum and Its Effect on Specific Surface Area, Clay Science, 1992, 31(4):196-201.
Yoshino, Effects of Properties of Fly Ash on Added Amount of Chemical Admixture, Annual Collection of Papers of Concrete Engineering, 2005, 27(1):175-180 [English Language Translation Only].
Japanese Patent Office, Notification of Reason(s) for Refusal, Patent Application No. 2012-552471, Feb. 18, 2014, 5 pages [English Language Translation Only].

* cited by examiner

*Primary Examiner* — Paul Marcantoni
(74) *Attorney, Agent, or Firm* — Quarles & Brady LLP

(57) ABSTRACT

According to the invention there is provided A hydraulic lime composition including between 1 and 20% by weight of a Pozzolanic material which has a surface area of between 2 and 1000 $m^2 g^{-1}$ when measured by BET $N_2$ porosimetry, and an average particle size in the range 0.1 to 1000 μm.

20 Claims, No Drawings

HYDRAULIC LIME COMPOSITION

CROSS-REFERENCE TO RELATED APPLICATIONS

This application represents the national stage entry of PCT International Application No. PCT/GB2011/050242 filed Feb. 10, 2011, which claims the benefit of Great Britain Application 1002223.4, filed Feb. 10, 2010, both of which are hereby incorporated herein by reference for all purposes.

This invention relates to hydraulic lime compositions including Pozzolanic material, methods of preparing same and uses thereof.

The construction industry is reliant on functional and economical inorganic binders for aggregates in the preparation of mortar and plaster compositions. Mortars, renders and plasters are a blend of inert aggregate, binder and other functional additives which when mixed with water to form a paste are used to either fill the gaps between bricks and blockwork or to cover bricks and blockwork and allowed to dry and cure to provide an aesthetically pleasing and functional filler or covering. For ease of description, all references to mortar herein includes mortar, render, plasters, pargetting, screed, limewash, paint and colloquial derivatives thereof. In addition, reference to brick or bricks shall include stone, blockwork and any other units of masonry. Mortars are applied wet and then allowed to dry in-situ by a two phase process which is referred to as initial setting followed by full hardening. Setting describes the primary point at which a mortar changes from plastic to solid. Hardening is the secondary consolidation of the setting process through which mortars and plasters gain their long term functionality including strength.

Lime, more specifically calcium oxide, calcium hydroxide and derivatives, has been used as a binder for mortar for over 1000 years. Calcium hydroxide is manufactured from naturally occurring limestone (calcium carbonate) which is thermally decomposed in a process known as calcination to give calcium oxide (quicklime) and gaseous carbon dioxide. Quicklime is subsequently contacted with water in a process known as slaking to give calcium hydroxide. The definition of lime herein also includes mixtures of calcium and magnesium hydroxides prepared as above from high purity carbonate limestone, calcitic limestone, magnesian limestone, dolomitic or high magnesium dolomite deposits comprising intimate mixtures and compounds of calcium and magnesium carbonates of any stoichiometry, called quicklime, hydrated lime, dolime or dolime hydrates whether fully or partly hydrated. (JAG, Oates, "Limes and Limestone", Wiley, 1998, ISBN 3-527-295275). For ease of description, any reference to calcium components of lime such as lime, limestone, quicklime, hydrated lime or $Ca(OH)_2$ also automatically includes analogous calcium/magnesium compounds for any ratio of calcium to magnesium. For example hydrated lime, $Ca(OH)_2$, is analogous to $xCa(OH)_2 \cdot yMgO$ and $xCa(OH)_2 \cdot yMg(OH)_2$, quicklime, $CaO$, is analogous to $xCaO \cdot yMgO$ and limestone, $CaCO_3$, is analogous to $xCaCO_3 \cdot yMgCO_3$ or $xCayMg(CO_3)_2$ where $x+y=0$ where $x>0$ in any possible combination. Pure calcium hydroxide, in general but not limited to materials where %$Ca(OH)_2$ is >95% by mass as determined on an as received sample of material dried in air at 100° C. until constant mass is achieved especially in the case of lime putty or other aqueous slurries of calcium hydroxide, can be used as mortar binder as it reacts with $CO_2$ in the atmosphere to give calcium carbonate, a process called carbonation which binds aggregate particles in mortars together. However this process is generally uneconomic as the setting time is long (typically measured in weeks) and/or is non-hydraulic (the setting process needs air contact and such mortars will not set underwater) and/or the resulting mortar has comparatively low compressive and flexural strength for construction purposes. Setting time is defined as Vicat final setting time as described in BS196-3:2005. Such calcium hydroxide materials are commonly referred to as hydrated lime, powdered lime, powdered hydrated lime, powder building lime or semi-liquid lime putty. For ease of description, all such materials herein shall be referred to as hydrated lime. Mortars made with hydrated limes are called air limes.

However it is known that by producing a hydrated product, analogous to a hydrated lime, from limestone and/or quicklime containing certain naturally occurring impurities, in general but not limited to a material where $Ca(OH)_2$ is <95% by mass as determined on an received sample of material dried in air at 100° C. until constant mass is achieved, such as clay or by adding various by-product materials including but not limited to brick dust and blast furnace slag, fly ash, silica fume or clay to a hydrated lime or quicklime prior to slaking or limestone prior to calcination, a hydraulic lime material can be prepared that acts as binder for mortars. A mortar prepared using a hydraulic lime sets (Vicat final setting time) significantly more quickly than one prepared using a hydrated lime alone (typically measured in hours or days) and/or giving significantly greater compressive and/or flexural strengths and with a hydraulic set (setting process will occur under water and in the absence of direct air or $CO_2$ contact in comparison with hydrated lime which is non-hydraulic). Impurities or additives in $Ca(OH)_2$ that cause a hydraulic set and/or increase setting rate and/or increase in compressive and/or flexural strength, when compared to similar mortars prepared using hydrated lime alone, are called Pozzolanic materials or Pozzolan. Pozzolans react with $Ca(OH)_2$ in the presence of water in the absence of $CO_2$ causing hydraulic limes to set and harden. Mixtures derived from mineral deposits containing pozzolanic material and/or synthetic blends of calcium hydroxide and Pozzolan and/or blends of hydrated lime and Pozzolan in any proportion are known as hydraulic limes. Products derived solely from mineral deposits without synthetic additive are often called natural hydraulic limes (NHL) with a numerical suffix to denote strength according to EN459-2:2001 (e.g. NHL3.5). In general but without limitation, hydraulic lime mortars have compressive strengths in range of 0.5 to 25 $N/mm^2$ and Vicat final setting times of <168 hours. The use of hydraulic limes as a binder for mortars has been superceded in recent times by the use of cement and/or gypsum based products due either the need to increase strength, reduce cost or provide ease of use.

However cement and gypsum materials have significant drawbacks in use as binder or plaster because a) their manufacture produces significant $CO_2$ emissions; b) mortars prepared using them are impervious to water causing construction defects such as efflorescence and spalling (frost or salt damage to bricks); c) mortars prepared with them are brittle in use giving rise to cracks in mortar and bricks and other damage if buildings move and d) significant water solubility of their components causing degradation of building components by efflorescence and similar processes. The use of hydraulic lime binders can overcome these limitations as the manufacture of hydraulic limes can generate over 60% less $CO_2$ than cement. Lime mortars, renders and plasters are also porous and stable in the presence of water, minimising damage such as efflorescence and spalling. Lime mortars are also significantly softer and less brittle than cement or gypsum products and are tolerant of movement in buildings, deforming and self-healing (autogenous healing) thus allowing movement while retaining stability Such action minimises structural defects, thus improving the longevity of structures built using hydraulic limes over those using cementious mortars or gypsum plasters. This tolerance to movement is particularly important where construction methods allow different materials to be joined to together such as wood and brick. Lime mortars are frequently tolerant of their different expansion rates and thus their use can avoid the use of expensive expansion joints frequently required in construction when using cement or gypsum mortars.

However limited global availability of hydraulic lime has prevented its widespread use in modern construction. Almost all hydraulic lime products are derived from naturally occurring deposits of limestone containing suitable impurities however these are comparatively rare, geographically discrete and limited in volume giving rise to concerns over continuity of quality, limited supply and cost of transport.

Hydrated lime (or quicklime) products are however widely available in most countries, produced from local high purity limestone deposits, for use as raw materials for steel, sugar and construction industries as examples. Such non-hydraulic materials can be converted to hydraulic limes by addition of a suitable pozzolan. However the sourcing of suitable and sustainable sources of pozzolans is a critical factor. Synthetic pozzolans such as calcined metakaolin clays, for example Imerys Metastar 501, are produced in limited quantities from geographically discrete locations often emitting significant $CO_2$ during their production. Other pozzolanic materials, such as brick dust, blast furnace slag, silica fume (e.g. by product from silicon metal or ferrosilicon alloys production), rice husk ash and fly ash are by-products, derived from other processes such as coal fired power stations, have significant disadvantages as they contain soluble impurities and/or are derived from energy inefficient sources and/or not produced under strict quality control procedures and/or may contain undesirable components that are deleterious to performance or health such as crystalline silica or heavy metals or Cr (VI) compounds.

Naturally occurring Pozzolan type materials do exist such as volcanic rock derivatives however they are very limited in global supply and do not have a consistent composition. Whilst widely available minerals such as quartz and wollastonite contain chemical species which have the potential to show pozzolanic activity such as silica or alumina and their derivatives, their crystalline structure and inert chemical form means that they are not suitable for use in commercial hydraulic limes. Furthermore significant concerns exist over the carcinogenic character of crystalline silica materials such as quartz and cristobalite. AT 410089 discloses hydraulic limes comprising a mixture of hydrated lime and $SiO_2$ wherein the overall mixture is milled to achieve certain Blaine fineness requirements. AT 410089 does not disclose the source and type of the $SiO_2$. Other material additives can increase the hydraulic character of limes such as cement and/or gypsum. U.S. Pat. No. 5,910,215 for example, discloses the use of gypsum. However, the use of calcium sulphate material is undesirable due to the physical characteristics imparted on the final mortar such as brittleness, instability in the presence of water and lack of vapour permeability. The present inventor has recognised that, to address the technical and economic issues identified herein, it is necessary to identify a Pozzolanic material whose availability, structure, purity and low solubility of both constituents and reaction products permits its safe and economic use in commercial hydraulic limes and therefore in mortars and plasters.

According to the invention there are provided compositions of hydraulic lime, uses and methods as set out in the appended claims.

Average particle size is defined herein as the number mean diameter or length of the particles within a sample. The average particle size may be determined using one or more suitable methods such as graded sieves, microscopy, light scattering or sedimentation techniques without limitation and as appropriate for the average particle size. These are described more fully elsewhere (Jillavenkatesa A, Dapkunas S J, Lin-Sien Lum, *Particle Size Characterization*, NIST Special Publication 960-1, 2001).

The solution to the above identified problems requires a readily available and sufficiently low cost Pozzolanic material whose activity is sufficient to effect timely setting and hardening when used in commercial construction methods and whose solubility or that of its reaction products is carefully selected to act as an efficient Pozzolan whilst at the same time having sufficiently low solubility to prevent leaching or aqueous deterioration either during preparation/setting/hardening or over time through external weathering or the cycle of water absorption/emission frequently observed in building fabric due to changes in ambient conditions.

Examination of known cementicious and gypsum mortars, Pozzolanic additives and bricks/stone shows them to contain aluminium oxides, aluminium hydroxides, aluminium salts, silicon oxides, phosphoric acid and its salts, sulphur and its compounds, iron oxides/hydroxides and other iron salts, magnesium oxide/hydroxide and other magnesium salts, calcium oxides/hydroxides and other salts, potassium oxides/hydroxides and other salts and sodium hydroxides and other salts. Of these, it is particularly noted that aluminium, silicon, iron and phosphorus compounds are found in Pozzolanic material and are known to act as setting and hardening agents for lime due to their Lewis acid nature.

However inspection of the raw materials, additives and potential compounds formed in-situ during the preparation and use of mortars reveals that many are significantly water soluble or react further in-situ to give hydrated salts which gives rise to the weathering, leaching, efflorescence, spalling and speedy degradation frequently observed with modern building materials. By comparison with the use of suitable hydraulic lime compositions in mortars which do not show appreciable weathering, leaching, and efflorescence, it has been possible to conclude that aluminium compounds, iron compounds, phosphorus compounds, potassium compounds and sodium compounds are undesirable elements within a mortar composition and must be minimised where weathering or contact with water is expected and where longevity is an economic imperative. Inspection of the composition of efflorescence and the mortar from which it is leached over time indicates that effloresced materials are generally composed of complex aluminium, iron, phosphorous, sulphur, potassium and sodium compounds (Richie T., Study of efflorescence produced on ceramic wicks by masonry mortars, J. of the Am. Chem. Soc. 38, 362-366, 1955) leached from the mortar as the result of their solubility in water leaving behind a porous matrix of rich in calcium, magnesium and silicon compounds, notably carbonates and oxides whose water solubility is generally much lower.

As a result the present inventor has been able to draw conclusions over the desirability of an element within a mortar or plaster based on the solubility of its compounds in water whose pH is typically but not exclusively 2.5 to 10 as found in nature such as mortars and at temperatures typically found in the built environment such as but not limited to −20° C. to +50° C. Those components of stable mortar such as calcium, magnesium and silicon compounds frequently have low solubility in water. Data taken from the Handbook of Chemistry and Physics, 66$^{th}$ Edition, 1985-86, B68-B161 pertaining to examples of such materials include calcium carbonate ($CaCO_3$) 0.0014 g/L, magnesium carbonate ($MgCO_3$) 0.0106 g/L, hydrated magnesium carbonate ($MgCO_3.3H_2O$) 0.179 g/L, magnesium oxide (MgO) 0.00062 g/L, calcium silicate ($CaSiO_3$) 0.0095 g/L, sodium alumina trisilicate ($NaAlSi_3O_8$)<0.0001 g/L, sodium aluminium metasilicate ($Na_2O.Al_2O_3.4SiO_2$)<0.0001 g/L, sodium aluminium orthosilicate ($Na_2O.Al_2O_3.2SiO_2$)<0.0001 g/L, aluminium silicate ($Al_2O_3.2SiO_2$ and $3Al_2O_3.2SiO_2$)<0.0001 g/L, calcium magnesium carbonate ($CaMgCO_3$) 0.0078 g/L, silicon dioxide<0.0001 g/L, and silicic acid<0.0001 g/L without limitation are examples of such materials.

In contrast, examination of the components of mortar and plasters that are known to be less stable on contact with water and leach or effloresce easily and their water solubilities is enlightening. Example data taken from the Handbook of Chemistry and Physics 66$^{th}$ Edition 1985-86 include calcium iron (III) aluminate ($4CaO.Fe_2O_3.Al_2O_3$) 3 g/L, calcium chloride ($CaCl_2$) 74.5 g/L, aluminium sulphate ($Al_2(SO_4)_3$) 31.3 g/L, hydrated aluminium sulphate ($Al_2(SO_4)_3.18H_2O$) 86.9 g/L, magnesium sulphate ($MgSO_4$) 26 g/L, magnesium sulphate monohydrate ($MgSO_4.H_2O$), magnesium sulphate heptahydrate ($MgSO_4.7H_2O$) 71 g/L, potassium carbonate ($K_2CO_3$) 112 g/L, hydrated potassium carbonate ($K_2CO_3.3H_2O$) 129 g/L, potassium hydrogen sulfate ($KHSO_4$) 12 g/L, potassium magnesium sulphate ($K_2SO_4.MgSO_4.6H_2O$) 19.3 g/L, sodium carbonate ($Na_2CO_3$) 7.1 g/L, calcium sulphate hemihydrate ($CaSO_4.0.5H_2O$) 0.3 g/L, calcium sulphate dehydrate ($CaSO_4.2H_2O$) 0.241 g/L, and iron (II) sulphate heptahydrate ($FeSO_4.7H_2O$) 15.6 g/L, which are, without limitation, examples of soluble species frequently found in commercial mortars and plasters.

The present inventor has concluded that the use of raw materials for mortar preparation that contain compounds whose solubility or solubility of a further chemical derivative of such raw material created during curing of the mortar/plaster or in contact with other elements of a mortar or binder, for example aggregate, or other exogenous materials such as brick, other building materials or acid rain is not desirable. Moreover, the present inventor has concluded that raw materials or their derivatives whose solubility in water in pH typically found in the environment is greater than 0.2 g/L are undesirable for mortars and plasters with economic longevity.

Analysis of elements and their compounds that meet the above requirements reveals that silicon, its hydroxide or other derivatives and derivatives of similar compounds with similar electronic structure such as titanium and zirconium are materials that have sufficient pozzolanic activity to meet the economic demands of chemical availability and of low solubility. In particular, silicon dioxide otherwise known as silica or $SiO_2$ is a known Pozzolanic element as described previously. Silica is available in many forms, and some of these have been explored as Pozzolanic additives for lime. Pure Silica is widely commercially available as ground quartz, ground cristobalite often referred to as flours. The particles of silica flour frequently have simple morphology due to grinding which gives them a low surface area. Spheroidal particles of 100 microns which is typical of milled minerals of this type have theoretical surface areas of approximately 0.5 $m^2g^{-1}$. Inspection of commercially available quartz flours such as Sibelco M300 and M3000 have measured surface areas of 0.9 and 1.5 $m^2g^{-1}$ respectively indicating little or no intra particle porosity when these materials are analysed using BET nitrogen porosimetry techniques (S. Brunauer, P. H. Emmett and E. Teller, *J. Am. Chem. Soc.*, 1938, 60, 309). Quartz and cristobalite material are generally composed of a crystalline, ordered, regular silicon-oxygen lattice of highly dehydrated $SiO_2^{4-}$, an exceptionally stable material which has very low solubility. However when combined with low surface areas from which such species can be solubilised as pozzolanic hydrated silicas species (e.g. $Si(OH)_4$), it can be shown that the rate of dissolution is too low to perform economically as an efficient Pozzolan for hydraulic lime. This strongly indicates that dissolution and mass transport of hydrated silica species from silica source to the aqueous phase in a lime mortar or plaster followed by reaction with $Ca(OH)_2$ is critical in defining a commercial Pozzolanic additive.

Other commercial sources of silica that have been explored as Pozzolanic additives include silica fume as a by-product of metal/alloy production, coal fired power stations and agricultural by-products such as burned rice husks. Concerns exist over their purity as they frequently contain heavy metals and/or undefined organic compounds and/or crystalline silica phases that are considered carcinogenic and deleterious to mortar performance. Such materials are generally by-products of other manufacturing processes which is not a reliable, quality-assured source of raw materials. Synthetic fumed silica products are available but are expensive to manufacture and are uneconomic for pozzolanic application. Bulk density is the measurement of mass of a fine powder within a defined volume that provides an indication of the packing of the particle including pore volume, inter particle void volume and intra particle pore volume. Despite a theoretical density of 2200 $kg/m^3$, silica fume materials and fumed silicas rarely show bulk densities greater than 100 $kg/m^3$ more typically 50 to 70 $kg/m^3$ even with densification. Such low bulk densities make the silica fume expensive to transport.

Some potential Pozzolans such as fume are frequently found to have surface areas in excess of 1000 $m^2 g^{-1}$ when measured using BET $N_2$ porosimetry. The same nitrogen absorption techniques can be used to determine the porosity of the structure in $m^3 g^{-1}$. Structures of Pozzolan particles with very high surface areas will have significant porosity as defined by the volume of a given absorbate per unit mass of Pozzolan. Few materials exhibit porosity greater than $5 \times 10^{-7}$ $m^3g^{-1}$. Silica fume and fumed silica tend to have $N_2$ pore volumes of less than $2 \times 10^{-7}$ $m^3g^{-1}$. As silica fumes generally have very low average particle size, typically $<1 \times 10^{-7}$ m and generally $<1 \times 10^{-8}$ m for synthetic fumed silicas, any porosity determined tends to be derived from analysis of inter-particle porosity rather than intra-particle porosity. The lower limits of pore diameter analysis using BET $N_2$ adsorption analysis is approximately $1 \times 10^{-8}$ m. Therefore, this analysis cannot readily distinguish between inter- and intra-particle porosity of particles less than $1 \times 10^{-8}$ m, and so individual particles of silica fume should be considered non-porous. BET theory, which underpins surface area measurement science, indicates that pore diameter is a function of porosity and surface area where average pore diameter (m) is determined from 4V/A where V is the porosity in $m^3g^{-1}$ and A is area in $m^2$. Where particle sizes are in excess of $1 \times 10^{-8}$ m, intra-particle porosity can be analysed using BET $N_2$ techniques. In an example where the particle size is $>1 \times 10^{-8}$ m, the porosity is measured at $1 \times 10^{-6}$ $m^3g^{-1}$ and surface area is measured at 1000 $m^2g^{-1}$, the average pore diameter is $4 \times 10^{-9}$m. The diameter of a water molecule is approximately $0.2 \times 10^{-9}$ m and a silicic acid molecule is approximately $0.5 \times 10^{-9}$ m. As a result it can be observed that both water and silicic acid can theoretically pass in and out of such pores into a bulk aqueous phase to act as a Lewis acid (pozzolanic active). However as both surface area and porosity increase as measured by $N_2$ methods, it can be shown that transport of both water and silicic acid from such defined structures is physically limited and as such are impractical for use as a Pozzolans. Therefore a structure whose primary particle size is $>1\times10^{-8}$ m with nitrogen porosity $1.25\times10^{-7} m^3 g^{-1}$ and surface area of $1000 m^2 g^{-1}$ has an average pore diameter of $0.5\times10^{-9}$ m which is very close to the molecular size of the essential solubilised $Si(OH)_4$ or silicic acid molecules required to act as Lewis acids thereby physically limiting their aqueous transport out of the bulk $SiO_2$ structure. Similarly, a theoretical material whose primary particle size is $>1\times10^{-8}$ m with porosity of $2.5\times10^{-7}$ $m^3 g^{-1}$ and a surface area of $2000 m^2 g^{-1}$ has an average pore diameter of $0.5\times10^{-9}$ m which will limit aqueous $Si(OH)_4$ transport in an identical manner. Similarly, a material whose primary particle size is $>1\times10^{-8}$ m with porosity of $0.62\times10^{-8}$ $m^3 g^{-1}$ and a surface area of $50 m^2 g^{-1}$ has an average pore diameter of $0.5\times10^{-9}$ m which will limit aqueous $Si(OH)_4$ transport in an identical manner. Therefore silicon, titanium or zirconium lewis acid compounds whose average pore diameter is less that $0.5\times10^{-9}$m are unlikely to perform well as Pozzolanic materials. To define satisfactory economic performance, materials whose average pore diameter is greater than $0.5\times10^{-9}$ m and that meet all the solubility and particle size criteria above can be shown to exhibit some useful Pozzolanic activity. For practical uses, particles with average pore diameters of less than $0.5\times10^{-9}$ m should be considered non-porous for lime mortar applications. In the example of synthetic fumed silica, such as Aerosil 150 from Degussa, these materials can exhibit some Lewis acid activity because their average particle size is low ($7\times10^{-9}$ m) and therefore individual particle surface area is high and individual particles are non-porous. Furthermore fumed silicas are manufactured at high temperature which gives rise to highly dehydrated structures of $SiO_4^{2-}$ which is poorly available as a soluble Pozzolan in mortars or plasters.

However a novel Pozzolan mixture has been discovered which overcomes the drawbacks highlighted by all existing Pozzolans above.

Many modern manufacturing and chemical processes require a pure, amorphous and porous form of silica. Rather than employ milled crystalline minerals such a quartz flours whose physical structure is crystalline and/or dense and non-porous containing largely chemically benign highly dehydrated silicic acid and salts combined with the carcinogenic potential of crystalline silicas, it has been necessary to develop synthetic routes to amorphous silica materials of high purity and suitable physical structure. Suitability of the physical structure is frequently determined by accessible surface area measured in $111^2 g^{-1}$ which in turn is determined by particle size measured in nm or μm, particle porosity measured in $m^3 g^{-1}$, particle morphology and chemical composition.

Synthetic amorphous silica materials are usually manufactured by thermal decomposition of silicon tetrachloride to give synthetic fumed silica or by destabilisation of concentrated aqueous solutions of alkali metal silicates and subsequent purification with physical or chemical modification. Some amorphous silicas can be found as naturally occurring minerals however consistent and pure deposits are not found widely. Such synthetic methods produce three classes of amorphous silica product; colloidal silica sols, xerogels or hydrogels as defined in "Silica, Amorphous", Kirk Othmer Encyclopaedia of Technology volume 22 2006.

It is possible to produce largely amorphous silicas by chemical or physical modification of naturally occurring minerals whose $SiO_2$ content is economically useful. One example of this is acid leaching of clay materials to remove the aluminium content as used in the manufacture of certain zeolites such as US-Y. Another example is the acid or alkali hydrothermal treatment of quartz. It is also possible to disturb the crystalline state of some naturally occurring silica materials producing amorphous structures by heating using conventional methods or using induction either by microwave or radio frequencies or by any combination of the aforementioned.

Using such synthetic materials, it has been determined that a Pozzolan material with $>75\% MO_2$, where M is Si, Zr or Ti or mixtures thereof or part neutralised salts thereof, where chemical composition is determined on a sample that has been treated under ambient atmosphere at $1000°$ C. for 2 hrs prior to analysis, referred to as dry basis as shown In BS EN ISO 3262-18:2000, and whose $N_2$ surface area is between 2 and $1000 m^2 g^{-1}$, and whose average particle size is between 0.1 μm and 1000 μm exhibit a surprising and particularly advantageous activity for setting and hardening lime mortars. Furthermore such synthetic materials whose water solubility is less than $0.2 gL^{-1}$ and/or whose average pore diameter is $>0.5\times10^{-9}$ m also exhibit surprising and particularly advantageous activity for hardening lime mortars or plasters. In some embodiments, a Pozzolan material with $>99\% MO_2$ is used. However, it is possible to use Pozzolan materials with a lower proportion of $MO_2$. For example, it is possible to accommodate amounts of iron or aluminium in various compounds, typically up to about 8% by weight on a dry basis of atomic iron or aluminium, but possibly up to about 17.5% by weight on a dry basis of atomic iron or aluminium. It will be appreciated that the weight percentages discussed above relate to the iron or aluminium constituents of iron or aluminium containing compounds, and not to the compounds themselves.

BET $N_2$ surface area should be determined on a dry samples in the substantial absence of water or solvent on derivatives from which the excess water or solvent has been removed by suitably gentle processes designed to protect the integrity of high surface area structures prior to analysis such as heat treatment or solvent extraction followed by heat treatment or air drying where the liquid is allowed to evaporate from the structure under ambient conditions or under any of the previous conditions where the material is subjected to pressures below standard atmospheric pressure. This applies in particular to all pozzolanic materials herein including hydrogels or similar materials prepared by precipitation in a non-aqueous solvent are used. Aggressive drying conditions can cause deterioration of a high surface area structure providing incorrect results from BET $N_2$ analyses. In addition, surface area measurements should be determined on samples substantially free from alkaline cations, excluding $H^+$, for example elements in groups I and II of the periodic table. Samples containing such cations may be purified and dried by suitable methods such as but not limited to washing of particles with a weak acid solution followed by a drying method as outlined above.

Furthermore the preparation and application of mortars including the novel pozzolan defined herein may employ a wide variety of chemical additives called admixtures. These may be employed with the novel pozzolan defined herein as necessary and examples thereof without limitation include accelerators (e.g. sodium formate), retarders (e.g. gelatine), air entrainers (e.g. surfactants), plasticisers (e.g. polyacrylates), inorganic or organic pigments (e.g. $TiO_2$), corrosion inhibitors, bonding agents, pumping agents, rheology modifiers (e.g. polyacrylamides), stabilisers (e.g. methyl cellulose), organic polymer binders, shrinkage reducers (e.g.

cycloaliphatic ether alcohol), waterproofing agents (e.g. waxes, polymer dispersions) and any combination thereof. Further examples without limitation may be found in Lea's Chemistry of Cement and Concrete, 4th Ed, Peter Hewlitt, Arnold, 1998. Mortar additives may also include low density aggregate material such as Perlite, Vermiculite or other low density inorganic or organic aggregate additives. Moreover the novel pozzolan defined herein may be used in combination with any other pozzolan defined in the prior art or commercially available natural hydraulic lime product. Whilst the invention has been described above, it extends to any inventive combination of the features set out above, or in the following description or claims.

EXPERIMENTAL

The testing of hydraulic lime is defined by British Standard BS EN 459:2001 in conjunction with BS196:2005 which determines and classifies the relative performance of hydraulic limes in mortar mixes through evaluation of their setting times and measurement of their flexural and compressive strengths on hardening.

BS EN459-2:2001 teaches that mortars should be prepared as defined by BS EN196-1:2005 using modified proportions that are more suitable for hydraulic limes. The composition of the mortar is defined by mass as one part hydraulic lime and three parts CEN Standard sand and 0.6 parts water. To determine the final setting time of freshly prepared mortars, mortars are moulded into suitable cylinders of 40 mm±0.2 mm depth and 75 mm±10 mm diameter.

Using suitable Vicat apparatus defined in BS EN196-3:2005 and with the moulded mortar submerged in water, the setting time is determined by the penetration of the plunger of the Vicat equipment into the mortar at predetermined times. Final setting time is determined when the depth of penetration of the plunger reaches a constant as measured in mm over time.

Setting times are therefore measured in minutes, hours or days. To determine the flexural and compressive strength of hardened mortar, freshly prepared mortar is formed into prisms of 40 mm (±1 mm)×40 m (±1 mm)×160 mm (±1 mm) using suitable moulds. The moulds are covered with plates and allowed to cure in air for 24 hr at 20° C.±1° C. before being demoulded and prisms transferred to a water tank where they are maintained fully submersed at 20° C.±1° C. for 28 days (BS196) or stored at 20° C.±1° C. for 28 days at % RH>90% (EN 459). This ensures that the compressive and flexural strengths determined are based on pozzolan induced hydraulic set and not carbonation. On completion of the period, the flexural and compressive strengths of the prisms are measured utilising a suitable press, apparatus and conditions as defined by BS EN 196-1:2005 and EN459-2:2001. The results from this test provide flexural and compressive strength in $N/mm^2$.

To evaluate the materials defined in this discovery, mortars were prepared using commercially available hydraulic limes and hydraulic limes prepared in the laboratory using commercially available hydrated lime such as but not limited to CL90 type products defined in EN459:2001 including Lhoist $Ca(OH)_2$ TA1, TA9, TA10 or Castle $Ca(OH)_2$ or Lafarge Hydralime blended with commercially available Pozzolanic materials and various other samples of commercial products containing $SiO_2$. The commercially available Pozzolan used was Imerys Metastar 501 which is a calcined clay containing aluminium and silica species, of particle size ca. 2 μm, surface area ca. 12 $m^2g^{-1}$ and bulk density 600 $kgm^{-3}$. The commercial products containing $SiO_2$ are listed in Table 1. Oil adsorption is a qualitative technique employed to evaluate the total void space in a powder sample where an oil such as linseed or dibutyl phthalate is added to the powder in measured volume aliquots and subjected to mixing with a spatula until the powdered sample starts to become a paste. Once the sample becomes a paste, the volume of oil added Is recognised to represent the volume void space between the powder samples and volume of larger pores within each powder particle (ASTM D1483-95(2007)). Bulk density is the qualitative measure of density of a powder that has been crudely compacted in a volumetric container to remove excess voids and air. It is frequently used to provide an indication of the density of materials for packing or bulk transport.

TABLE 1

Commercial $SiO_2$ containing products

| SiO2 source | Description | Particle Size (μm) | BET Surface Area ($m^2g^{-1}$) | Oil Adsorption (g/100 g) | Bulk Density ($kgm^{-3}$) | % $SiO_2$*[1] |
|---|---|---|---|---|---|---|
| PQ Neosyl FC | Synthetic precipitated silica | 18 | 472 | 224 | 150 | >95 |
| PQ Neosyl GP | Synthetic precipitated silica | 20 | 200 | 240 | 150 | >95 |
| PQ Gasil 35M | Synthetic silica gel | 4 | 300 | 200 | 180 | >95 |
| PQ Alusil ET | Synthetic amorphous precipitated aluminosilicate | 9 | 100 | 185 | 150 | >80 |
| Rhodia Rhodoxane 34 | Synthetic amorphous precipitated aluminosilicate | 8 | 60 | 160 | 150 | >75 |
| Sibelco M300 | Ground quartz | 17 | 0.9 | 19 | 350 | >95 |
| Sibelco M3000 | Ground cristobalite | 17 | 1.5 | 26 | 700 | >95 |
| Degussa Aerosil 150 | Fumed silica | 0.014 | 150 | 235 | 50 | >95 |

TABLE 1-continued

Commercial SiO2 containing products

| SiO2 source | Description | Particle Size (μm) | BET Surface Area (m²g⁻¹) | Oil Adsorption (g/100 g) | Bulk Density (kgm⁻³) | % SiO$_2$*[1] |
|---|---|---|---|---|---|---|
| Degussa Aerosil 300 | Fumed silica | 0.007 | 300 | 250 | 50 | >95 |
| Degussa COK84 | Fumed aluminosilica | 0.001 | 135 | 220 | 50 | >95 |
| Metastar 501 | Calcined clay | 2 | 12 | — | 600 | ~55 |

*[1]Analysis completed on samples pretreated at 1000° C. for 2 hrs under ambient atmosphere as found in BS EN ISO3262-18:2000

To test the efficiency of these commercial SiO$_2$ sources mortars were prepared and tested In alignment with BS EN196-1:2005, BS EN196-3:2005 and BS EN459-2:2001. The sand used was a commercially available kiln dried sharp sand sieved to approximately <2 mm (particle size analysis; >5000 μm=0%, 5000 μm>0.1%>2360 μm, 2360 μm>0.6%>1180 μm, 1180 μm>2.1%>600 μm, 600 μm>50.6%>300 μm, 300 μm>46.3%>75 μm, <75 μm=0.3%). Where the specified amounts of water were insufficient to give a continuous mortar mix, the oil adsorption of the sand/hydraulic lime mix was determined and used to define the mass of water added to the mortar mix. The hydraulic lime portions of these mortars were prepared by blending commercial hydrated lime with specific amounts of commercial SiO$_2$ containing materials. The efficiency of these blends as hydraulic limes was measured against the performance of a commercially available natural hydraulic lime and a commercially available pozzolan, Metastar 601 (sample 8). In addition, a control mortar (Control 2) was prepared using calcium hydroxide and sand only blend which contained no Pozzolan additive (an air lime).

The composition of the mortar samples are given in Table 2.

TABLE 2

Composition of mortar samples prepared

| Sample ID | Ca(OH)2 Source | Pozzolan | Sand (g) | Ca(OH)2 or hydraulic lime (g) | Pozzolan (g) | Sand to Binder ratio (w/w) | Water (g) |
|---|---|---|---|---|---|---|---|
| Control 1 | St Astier NHL3.5 hydraulic lime | n/a | 600 | 200 | 0 | 3 | 130 |
| Control 2 | Lhoist Ca(OH)2 TA9 | n/a | 600 | 200 | 0 | 3 | 180 |
| Sample 1 | Lhoist Ca(OH)2 TA9 | Neosyl FC | 600 | 188 | 12 | 3 | 170 |
| Sample 2 | Castle Ca(OH)2 | Neosyl FC | 600 | 188 | 12 | 3 | 155 |
| Sample 3 | Lhoist Ca(OH)2 TA9 | Neosyl FC | 600 | 184 | 16 | 3 | 160 |
| Sample 4 | Lhoist Ca(OH)2 TA9 | Neosyl FC | 600 | 180 | 20 | 3 | 160 |
| Sample 5 | Lhoist Ca(OH)2 TA9 | Neosyl FC | 600 | 176 | 24 | 3 | 170 |
| Sample 6 | Lhoist Ca(OH)2 TA9 | Neosyl FC | 533 | 250 | 16 | 2 | 200 |
| Sample 7 | Lhoist Ca(OH)2 TA9 | Neosyl GP | 600 | 188 | 12 | 3 | 176 |
| Sample 8 | Lhoist Ca(OH)2 TA9 | Metastar 501 | 600 | 188 | 12 | 3 | 136 |
| Sample 9 | Lhoist Ca(OH)2 TA9 | M300 | 600 | 188 | 12 | 3 | 152 |
| Sample 10 | Lhoist Ca(OH)2 TA9 | M3000 | 600 | 188 | 12 | 3 | 152 |
| Sample 11 | Lhoist Ca(OH)2 TA9 | Aerosil 150 | 600 | 188 | 12 | 3 | 190 |
| Sample 12 | Lhoist Ca(OH)2 TA9 | Aerosil 300 | 600 | 188 | 12 | 3 | 190 |
| Sample 13 | Lhoist Ca(OH)2 TA9 | Aerosil COK84 | 600 | 188 | 12 | 3 | 190 |
| Sample 14 | Lhoist Ca(OH)2 TA9 | Gasil 35M | 600 | 188 | 12 | 3 | 152 |

TABLE 3

Results from analyses of set times, flexural and compressive strengths

| Sample ID | Mortar Setting Time (hrs) | Flexural Strength (N/mm2) 28 days | Compressive Strength (N/mm2) 28 days | Notes |
|---|---|---|---|---|
| Control 1 | 26 | 1.7 | 1.36 | Some prisms disintegrated on immersion in water due long set time |
| Control 2 | Nd*[2] | Nd*[2] | 0.23 | Some prisms disintegrated on immersion in water due long set time |
| Sample 1 | 6 | 0.71 | 0.91 | |
| Sample 2 | 5 | 1.45 | 1.06 | |
| Sample 3 | 4 | 0.85 | 1.11 | |
| Sample 4 | 4 | 1.02 | 1.2 | |
| Sample 5 | 4 | 1.25 | 1.42 | |
| Sample 6 | 5 | 1.14 | 0.91 | |
| Sample 7 | 7 | Nd*[2] | 0.95 | |

TABLE 3-continued

Results from analyses of set times, flexural and compressive strengths

| Sample ID | Mortar Setting Time (hrs) | Flexural Strength (N/mm2) 28 days | Compressive Strength (N/mm2) 28 days | Notes |
|---|---|---|---|---|
| Sample 8 | >24 | 1.14 | 0.91 | Most samples failed to set, were difficult to remove from mould intact and most prisms disintegrated on immersion in water |
| Sample 9 | Nd*2 | Nd*2 | Nd*2 | All prisms disintegrated on immersion in water due long set time |
| Sample 10 | Nd*2 | Nd*2 | Nd*2 | All prisms disintegrated on immersion in water due long set time |
| Sample 11 | 26 | 1.05 | 0.97 | |
| Sample 12 | Nd*2 | Nd*2 | 0.23 | |
| Sample 13 | Nd*2 | Nd*2 | 0.23 | |
| Sample 14 | 9 | 1.08 | 1.21 | |

*2Nd = not determined

From examination of the results in Table 3 especially samples 1 to 7 and sample 14 in comparison with commercial Control 1, sample 8 and air lime Control 2, it can be concluded that silicas whose average particle sizes are between 0.1 μm and 1000 μm and whose surface areas are between 2 $m^2g^{-1}$ and 1000 $m^2g^{-1}$ and average pore diameter of $>0.5 \times 10^{-9}$ m are particularly suitable as Pozzolanic additives when added during the preparation of lime mortar immediately prior to use at levels between 1 and 20% by mass of combined mass of pozzolan and mass of the hydrated lime (calcium hydroxide) employed.

Pozzolanic materials may be added directly to hydrated or hydraulic lime or quicklime, aggregate, water and additives during the preparation of a mortar or plaster. Pozzolanic materials may be preblended with calcium hydroxide powder or lime putty prior to use in preparing a mortar or plaster to give a hydraulic lime, In addition they may also be added to calcium oxide prior to slaking or to calcium carbonate prior to calcination/slaking to give suitable hydraulic lime compositions that may used to prepare a mortar or plaster.

To test the efficiency of these alternative methods of hydraulic lime preparation, selected Pozzolans (Neosyl FC) defined in Table 1 were added to calcium oxide prior to slaking in sufficient amounts to give hydraulic lime containing levels of Pozzolanic material similar to those found in table 2. Hydraulic limes prepared in this way were then tested as outlined previously.

TABLE 4

Composition of hydraulic limes prepared by adding Pozzolan during the slaking process

| Sample ID | Mass Lhoist CaO (g) | Mass INEOS FC (g) | Mass water (g) |
|---|---|---|---|
| SL1 | 213 | 18.1 | 74 |
| SL2 | 213 | 18 | 74.4 |
| SL3 | 208.5 | 24 | 72.6 |
| SL4 | 204.3 | 30 | 71.5 |
| SL5 | 199.8 | 36.3 | 70.1 |

The hydraulic limes prepared as described in Table 4 were then used to prepare mortars for testing as described previously. The composition of the mortars used are given in Table 5.

TABLE 5

Mortar composition employing hydraulic lime prepared by adding the Pozzolan to CaO prior to slaking.

| Sample ID | ID of hydraulic lime used | Mass of hydraulic lime (g) | Mass of sand (g) | Mass of water (g) |
|---|---|---|---|---|
| Sample 15 | SL1 | 200 | 600.5 | 128.7 |
| Sample 16 | SL2 | 200.5 | 600 | 136.5 |
| Sample 17 | SL3 | 200.9 | 600.9 | 156.2 |
| Sample 18 | SL4 | 200.3 | 601.1 | 144.6 |
| Sample 19 | SL5 | 200.2 | 600.3 | 168.8 |

The samples defined in Table 5 were cured and tested in accordance with BS EN196-1:2005 and BS EN196-3:2005 using the kiln dried sharp sand defined previously for samples 1 to 14. The results of the set time, flexural strengths and compression strengths are given in Table 6.

TABLE 6

Results from analyses of set time, flexural strength and compressive strength

| Sample ID | Mortar Setting Time (hrs) | Flexural Strength (N/mm$^2$) 28 days | Compressive Strength (N/mm2) 28 days |
|---|---|---|---|
| Sample 15 | 16 | 1.25 | 1.21 |
| Sample 16 | 27 | 1.14 | 1.24 |
| Sample 17 | 4 | 1.25 | 1.06 |
| Sample 18 | 4 | 0.91 | 1.59 |
| Sample 19 | 2 | 1.71 | 1.7 |

From the results in Table 6, it can be concluded from inspection of Samples 15 to 19 that the optimum Pozzolans identified in Table 3 may be added during the slaking process used to prepare a hydraulic lime to give commercially useful compositions. Furthermore it can be concluded that the addition of such optimum Pozzolans is possible at any stage in the preparation of a mortar whether during the final blending of aggregate, binder and water immediately prior to use or as a dry preblended mix of Pozzolan and hydrated lime (calcium hydroxide) or as a preblended mix of Pozzolan and lime putty or during the slaking of calcium oxide to give hydraulic lime or during the calcination and slaking of calcium carbonate to give calcium hydroxide to provide a commercially useful binder.

EN459-2:2001 teaches that prisms prepared may be cured at 20° C. at >90% RH for 28 days, in contrast the full immersion of BS196-1:2005. To explore the effect of these conditions on pozzolan mixtures in addition to curing mortar samples at 20° C. under ambient atmosphere and % RH (typically 60% RH) wherein some carbonation may occur, a series of examples were prepared and tested using an alternative, more typical commercial sharp sand (particle size analysis: >5000 μm=3.4%, 5000 μm>20.7%>2360 μm, 2360 μm>15.1%>1180 μm, 1180 μm>17.8%>600 μm, 600 μm>20.1%>300 μm, 300 μm>21.7%>75 μm, <75 μm=1.2%, sand density=1.4 g/mL). The results are shown in Table 7.

TABLE 7

Further exploration of pozzolan performance against a basket of commercial NHL3.5 products

| Sample ID | Composition | Final Set Time (hrs) | 28 day Flexural Strength (N/mm²) cured >90% RH | 28 day Compressive Strength (N/mm²) cured >90% RH | 28 day Flexural Strength (N/mm²) cured-60% RH | 28 day Compressive Strength (N/mm²) cured-60% RH |
|---|---|---|---|---|---|---|
| 20 | Sand 2000 g, Hydralime CL90 (Ca(OH)₂ only) 276 g, Water 167 g (control 3) | did not set | 0.38 | 0.45 | Nd*³ | Nd*³ |
| 21 | Sand 2000 g, Commercial St. Astier NHL3.5 hydraulic lime 235 g, Water 167 g | <24 | 1.36 | 1.03 | 1.14 | 0.74 |
| 22 | Sand 2000 g, Commercial Singleton Birch NHL3.5 hydraulic lime 235 g, Water 167 g | <24 | 1.44 | 0.84 | 1.36 | 0.83 |
| 23 | Sand 2000 g, Commercial SOCLI NHL3.5 hydraulic lime 235 g, Water 167 g | <24 | 0.8 | 0.79 | 1.42 | 0.99 |
| 24 | Sand 2000 g, Commercial Otterbein NHL3.5 hydraulic lime 235 g, Water 167 g | <24 | 1.74 | 1.07 | 1.36 | 0.67 |
| 25 | Sand 2000 g, Lhoist Ca(OH)₂ TA1 216.2 g, Neosyl GP 18.8 g (pozzolan), water 167 g | <24 | 1.53 | 0.93 | 1.53 | 1.80 |
| 26 | Sand 2000 g, Lhoist Ca(OH)₂ TA1 216.2 g, Alusil ET 18.8 g (pozzolan), water 167 g | <24 | 1.21 | 0.75 | Nd*³ | Nd*³ |
| 27 | Sand 2000 g, Lhoist Ca(OH)₂ TA1 209.7 g, Rhodoxane 34 18.2 g (pozzolan), water 160 g | <24 | 1.17 | 0.87 | Nd*³ | Nd*³ |

*³Nd = not determined

The invention claimed is:

1. A hydraulic lime composition including between 1 and 20% by weight of a pozzolanic material which has a surface area of between 50 and 800 m2/g⁻¹ when measured by BET N₂ porosimetry, and an average particle size in the range 0.1 to 1000 μm.

2. The hydraulic lime composition according to claim 1 wherein the solubility of the pozzolanic material or that of its hydrated species or salts in water is less than 0.2 gl⁻¹.

3. The hydraulic lime composition according to claim 1 including less than 12%, less than 10% by weight of the pozzolanic material.

4. The hydraulic lime composition according to claim 1 in which the pozzolanic material has a surface area of between 50 and 600 m²g⁻¹.

5. The hydraulic lime composition according to claim 1 which is free of aluminium, iron, phosphorous, potassium and sodium containing compounds.

6. The hydraulic lime composition according to claim 1 in which the pozzolanic material includes one or more compounds selected from the group consisting of silicon, titanium, or zirconium oxides, hydroxides, salts and acids.

7. The hydraulic lime composition according to claim 6 in which the pozzolanic material includes greater than 75%, on a dry basis of MO₂ where M is Si, Ti, or Zr, or at least partially neutralised salts thereof, or mixtures thereof.

8. The hydraulic lime composition according to claim 6 in which the pozzolanic material includes one or more compounds selected from the group consisting of silicic acid, silicon hydroxides, silicon oxides, and silicon containing salts.

9. The hydraulic lime composition according to claim 8 in which the pozzolanic material includes one or more synthetic silicon compounds.

10. The hydraulic lime composition according to claim 9 in which the pozzolanic material includes one or more synthetic silicon compounds prepared by precipitation or gelation.

11. The hydraulic lime composition according to claim 9 in which the pozzolanic material includes one or more synthetic silicon compounds prepared by chemical treatment, thermal treatment or other physical processing of naturally occurring silicon containing material.

12. The hydraulic lime composition according to claim 11 in which the naturally occurring silicon containing material is quartz or a clay or wollastonite or mixtures thereof.

13. The hydraulic lime composition according to claim 9 in which the synthetic silicon compounds are selected from the group consisting of silicic acid, silicon hydroxides, silicon oxides, and silicon containing salts.

14. The hydraulic lime composition according to claim 1 in which the pozzolanic material is amorphous.

15. The hydraulic lime composition according to claim 1 in which the average particle size of the pozzolanic material is in the range 0.1 to 100 μm.

16. The hydraulic lime composition according to claim 1 in which the average pore diameter of the pozzolanic material is greater than $0.5 \times 10^{-9}$ m when measured by BET $N_2$ porosimetry.

17. The hydraulic lime composition according to claim 1 which is free of calcium sulfate.

18. A method of making a mortar or plaster formulation comprising the step of using a hydraulic lime composition according to claim 1.

19. A method of making a mortar or plaster formulation comprising the step of using a pozzolanic material having a surface area of between 50 and 800 m2/g$^{-1}$ when measured by BET $N_2$ porosimetry, and an average particle size in the range 0.1 to 1000 μm.

20. A method of preparing a hydraulic lime composition including the steps of:

providing a pozzolanic material which has a surface area of between 50 and 800 m2/g$^{-1}$ when measured by BET $N_2$ porosimetry, and a particle size in the range 0.1 to 1000 μm; and blending said pozzolanic material with i) calcium hydroxide, or ii) a mixture of calcium hydroxide and calcium oxide or iii) calcium oxide prior to slaking, or iv) calcium carbonate prior to calcination; wherein the step of blending is performed so that the hydraulic lime composition contains between 1 and 20% by weight of the pozzolanic material.

* * * * *

UNITED STATES PATENT AND TRADEMARK OFFICE
CERTIFICATE OF CORRECTION

PATENT NO. : 9,067,830 B2
APPLICATION NO. : 13/577950
DATED : June 30, 2015
INVENTOR(S) : Robin Gibson It is certified that error appears in the above-identified patent and that said Letters Patent is hereby corrected as shown below:

In The Specification

Column 7, line 50 - "111" should be --m--

Signed and Sealed this
Sixteenth Day of August, 2016

Michelle K. Lee
*Director of the United States Patent and Trademark Office*